(12) United States Patent
Zhao et al.

(10) Patent No.: US 11,970,608 B2
(45) Date of Patent: Apr. 30, 2024

(54) COPOLYCARBONATE COMPOSITIONS AND ARTICLES

(71) Applicant: SHPP Global Technologies B.V., Bergen Op Zoom (NL)

(72) Inventors: Wei Zhao, Mt. Vernon, IN (US); Roy Ray Odle, Mt. Vernon, IN (US); Paul Dean Sybert, Mt. Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 591 days.

(21) Appl. No.: 17/265,172

(22) PCT Filed: Jul. 31, 2019

(86) PCT No.: PCT/US2019/044277
§ 371 (c)(1),
(2) Date: Feb. 1, 2021

(87) PCT Pub. No.: WO2020/028460
PCT Pub. Date: Feb. 6, 2020

(65) Prior Publication Data
US 2021/0309849 A1 Oct. 7, 2021

(30) Foreign Application Priority Data
Jul. 31, 2018 (EP) .................................... 18186710

(51) Int. Cl.
*C08L 69/00* (2006.01)
*C08G 64/12* (2006.01)
*C08K 3/32* (2006.01)
*C08K 5/42* (2006.01)
*C08K 5/524* (2006.01)

(52) U.S. Cl.
CPC .............. *C08L 69/00* (2013.01); *C08G 64/12* (2013.01); *C08K 3/32* (2013.01); *C08K 5/42* (2013.01); *C08K 5/524* (2013.01); *C08K 2003/329* (2013.01); *C08L 2201/08* (2013.01); *C08L 2201/10* (2013.01)

(58) Field of Classification Search
USPC .................................................. 528/196, 198
See application file for complete search history.

(56) References Cited

U.S. PATENT DOCUMENTS

2004/0116588 A1   6/2004   Lin et al.

FOREIGN PATENT DOCUMENTS

| WO | 2013175448 A1 | 11/2013 | |
|----|---------------|---------|---|
| WO | 2014072923 A1 | 5/2014 | |
| WO | 2017187425 A1 | 11/2017 | |
| WO | 2017203497 A1 | 11/2017 | |
| WO | WO-2017203497 A1 * | 11/2017 | ............. C08G 64/06 |

OTHER PUBLICATIONS

International Search Report for International Application No. PCT/US2019/044277, International Filing Date Jul. 31, 2019, dated oct. 18, 2019, 5 pages.
Written Opinion for International Application No. PCT/US2019/044277, International Filing Date Jul. 31, 2019, dated Oct. 18, 2019, 6 pages.
Office Action issued by the European Patent Office Feb. 1, 2024 in corresponding European Application No. 19756061.8, 4 pages.

* cited by examiner

*Primary Examiner* — Terressa Boykin
(74) *Attorney, Agent, or Firm* — CANTOR COLBURN LLP

(57) ABSTRACT

Provided are copolycarbonate compositions including a stabilizer package which comprise a phosphorous-containing acid, an ester of phosphorous-containing acid, and an organosulfonic stabilizer where the phosphorous-containing acid and the ester of a phosphorous-containing acid are present in a molar ratio of 1 to 2. The total stabilization package is for example, in the amount by weight of 4 to 32 ppm, 8 to 24 ppm, or 8 to 16 ppm and the organosulfonic stabilizer is, e.g., of 2 to 30 ppm, or 4 to 24 ppm, or 8 to 16 ppm.

20 Claims, No Drawings

COPOLYCARBONATE COMPOSITIONS AND ARTICLES

CROSS REFERENCE TO RELATED APPLICATIONS

This application is a U.S. national stage application, which claims priority to PCT/US19/044277, filed on Jul. 31, 2019, which claims priority to European Application No. 18186710.2, filed on Jul. 31, 2018, the contents of which are incorporated by reference in their entirety.

BACKGROUND

This application is directed to copolycarbonate compositions, in particular to compositions including copolycarbonates having high heat monomers.

Polycarbonates are widely used in many applications due to their excellent physical and mechanical properties. Polycarbonates can also be optically transparent with high clarity, making them suitable for many optical applications. However, some polycarbonates can yellow, especially when exposed to high heat, for example, under abusive processing conditions.

There accordingly remains a need for polycarbonate compositions having an improved balance of high heat performance and optical properties.

SUMMARY

In an aspect, polycarbonate compositions are provided that comprise: a polycarbonate copolymer comprising bisphenol A carbonate units and second carbonate units of the formula:

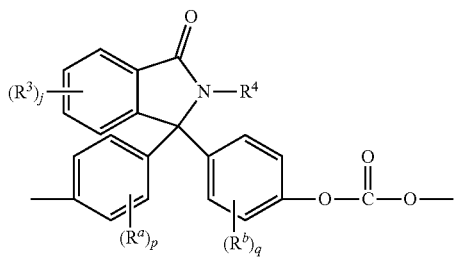

wherein $R^a$ and $R^b$ are each independently a $C_{1-12}$ alkyl, $C_{1-12}$ alkenyl, $C_{3-8}$ cycloalkyl, or $C_{1-12}$ alkoxy, each $R^3$ is independently a $C_{1-6}$ alkyl, $R^4$ is hydrogen, $C_{2-6}$ alkyl, or phenyl optionally substituted with 1 to 5 $C_{1-6}$ alkyl groups, p, q, and j are each independently 0 to 4; and optionally, a bisphenol A homopolycarbonate; wherein the second carbonate units are optionally present in an amount for example of 10 to 49 mol %, or 13 to 40 mol % or 35 to 49 mol %, or 18 to 35 mol %, based on the sum of the moles of the copolycarbonate and the bisphenol A homopolycarbonate.

In still another aspect, articles made from the compositions are provided as well as methods of manufacture of an article, for example, comprising injection molding, injection-compression molding, heat-cool molding, extrusion, rotational molding, blow molding, or thermoforming the polycarbonate compositions described herein.

Exemplary articles include components of a camera, an electronic device, a vehicle, an electric equipment, an industrial equipment, a flashlight, a business machine, a lighting device, an imaging device, a protective article, a vision corrective device, a household appliance and a toy.

The above described and other features are exemplified by the following detailed description, examples, and claims.

DETAILED DESCRIPTION

Improved polycarbonate compositions comprising stabilizer packages are provided. The stabilizer package can provide improved properties, and includes a phosphorous-containing acid; an ester of a phosphorous-containing acid; and an organosulfonic stabilizer. In some aspects, the polycarbonate composition can have good initial color and transmission after molding under standard conditions. Further, the polycarbonate composition can have improved color after molding at aggressive conditions. In some aspects, the stabilizer package can unexpectedly provide an improved reduction of yellowness in a polycarbonate copolymer formulation with relatively high initial color.

The polycarbonates can be phthalimidine copolycarbonates, which are high heat copolycarbonates having a glass transition temperature of 155° C. or higher as determined by differential scanning calorimetry (DSC) as per ASTM D3418 with a 20° C./min heating rate. In some aspects, the phthalimidine copolycarbonates comprise bisphenol A carbonate units and second carbonate units of formula (1)

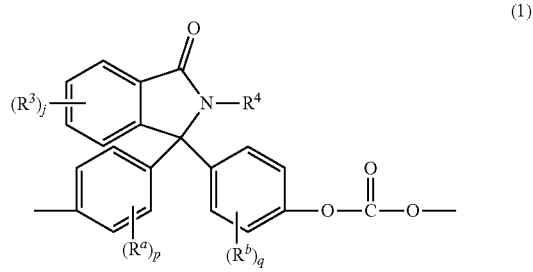

wherein
$R^a$ and $R^b$ are each independently a $C_{1-12}$ alkyl, $C_{1-12}$ alkenyl, $C_{3-8}$ cycloalkyl, or $C_{1-12}$ alkoxy, preferably a $C_{1-3}$ alkyl;
each $R^3$ is independently a $C_{1-6}$ alkyl, preferably a $C_{1-3}$ alkyl;
$R^4$ is hydrogen, $C_{1-6}$ or $C_{2-6}$ alkyl or phenyl optionally substituted with 1 to 5 $C_{1-6}$ alkyl groups; and
p, q, and j are each independently 0 to 4, preferably 0 to 1.

In an aspect, $R^a$ and $R^b$ are each the same and are each a $C_{1-3}$ alkyl; each $R^3$ is independently the same $C_{1-3}$ alkyl; $R^4$ is hydrogen, $C_{1-3}$ alkyl or phenyl; j is 0 or 1, preferably 0; and p and q are each independently 0 or 1, preferably 0.

For example, the second carbonate units can be of formula (Ia)

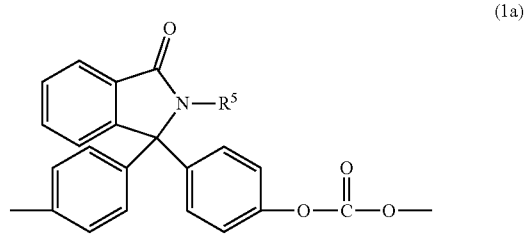

wherein $R^5$ is hydrogen, phenyl substituted with 0 to five $C_{1-6}$ alkyl groups, or $C_{1-4}$ alkyl, such as methyl or $C_{2-4}$ alkyl. In an aspect, $R^5$ is hydrogen or phenyl, preferably phenyl. Carbonate units (1a) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one or N-phenyl phenolphthalein or "PPPBP").

The bisphenol A carbonate units in the copolymer are formula (2).

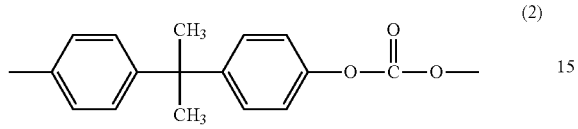

(2)

In some aspects, the copolycarbonate comprises from 50 to 90 mole percent (mol %) of the bisphenol A carbonate units and 10 to 50 mol % of the second carbonate units, or the copolycarbonate comprises from 55 to 85 mol % of the bisphenol A carbonate units and 15 to 45 mol % of the second carbonate units, and in an aspect the copolycarbonate comprises from 60 to 70 mol % of the bisphenol A carbonate units and 30 to 40 mol % of the second carbonate units, each based on the total number of carbonate units in the copolycarbonate.

The composition optionally further includes a bisphenol A homopolycarbonate including units of formula (2), wherein the second carbonate units are present optionally in an amount of 10 to 49 mol %, or 13 to 47 mol %, or 25 to 45 mol %, based on the sum of the moles of the copolycarbonate and the bisphenol A homopolycarbonate.

In some aspects, the high heat copolycarbonates further include at least 5 mol % of third carbonate units different from bisphenol A carbonate units and second carbonate units, based on the sum of the moles of the bisphenol A carbonate units, second carbonate units, and third carbonate units. The third carbonate units can have the formula

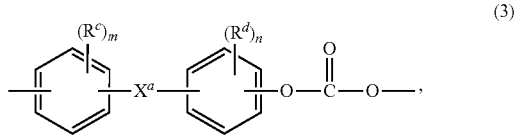

(3)

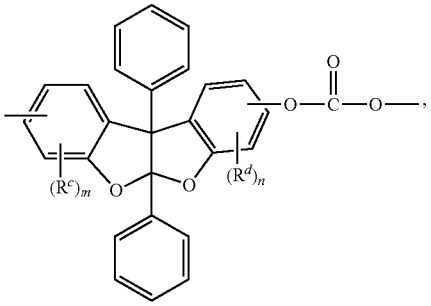

(4)

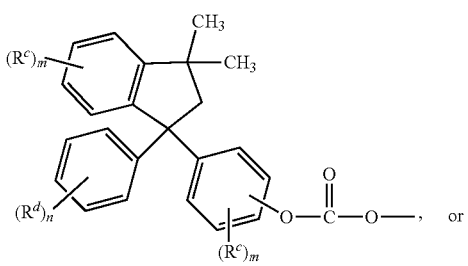

(5)

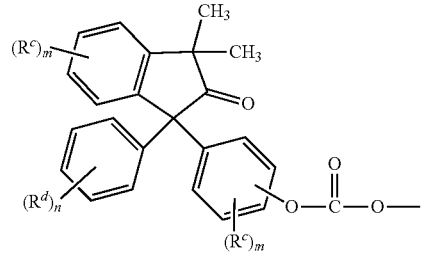

(6)

, or (7)

wherein $R^c$ and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, and y is 1, or $-C(P^1)(P^2)-$ wherein $P^1$ is a $C_{1-12}$ alkyl and $P^2$ is a $C_{6-12}$ aryl; and m and n are each independently 0 to 4.

Exemplary third carbonate units include the following

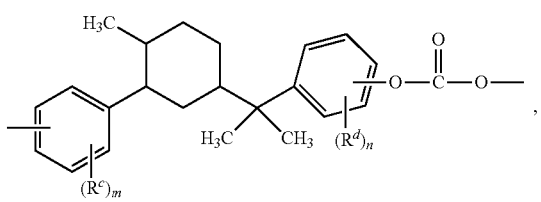

(3a)

,

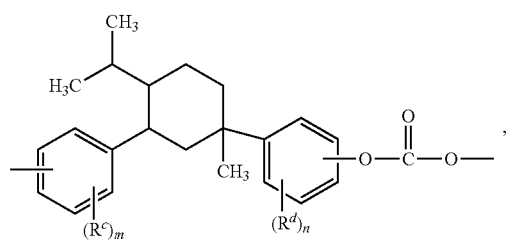

(3b)

,

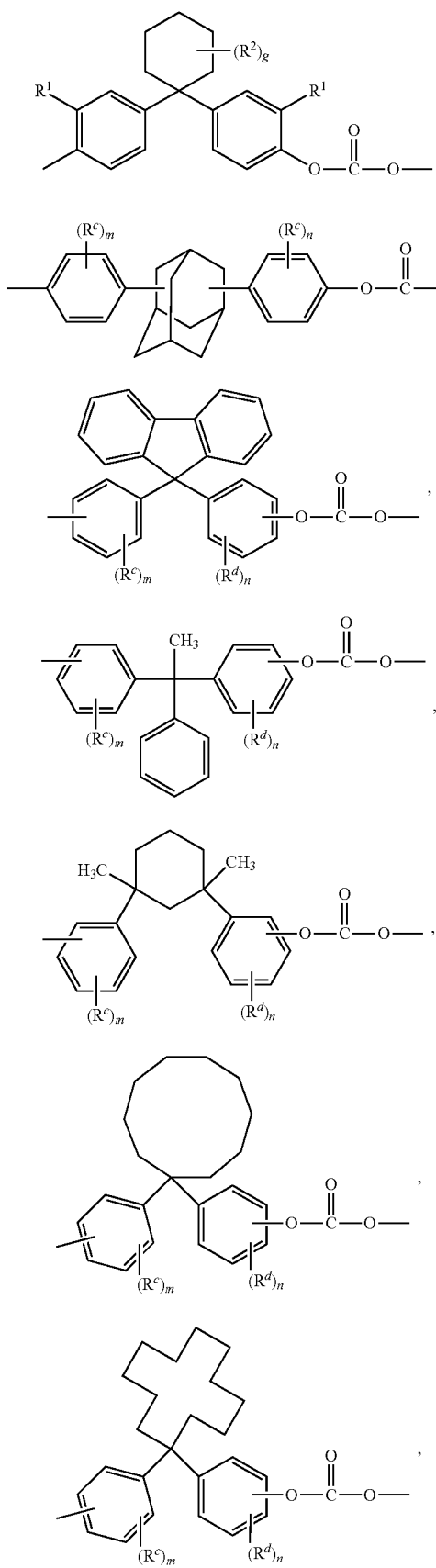
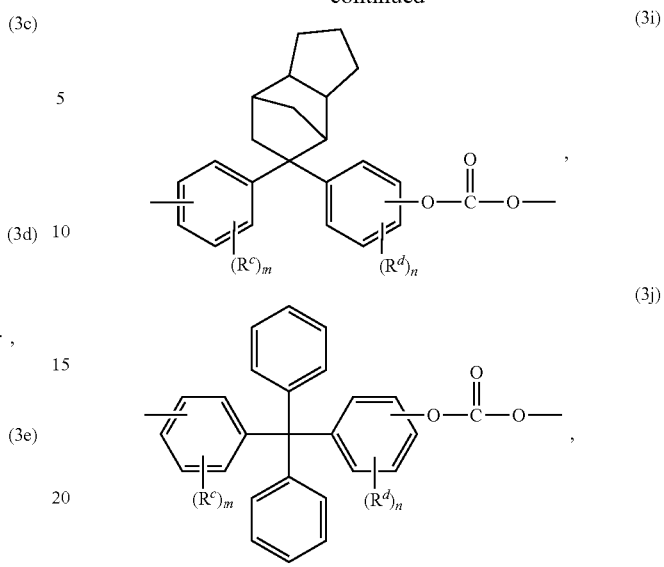

or a combination thereof, wherein R and $R^d$ are the same as defined herein for formulas (3) to (7), each $R^1$ is independently hydrogen or $C_{1-4}$ alkyl, each $R^2$ is independently $C_{1-4}$ alkyl, and g is 0 to 10. Preferably, each $R^1$ is independently hydrogen or methyl, each $R^2$ is independently methyl or hydrogen, g is 0 to 2, and m and n are 0. In a specific aspect the third carbonate units are 1,1-bis(4-hydroxyphenyl)-3,3,5-trimethyl-cyclohexane carbonate units, 1,1-bis(4-hydroxy-3-methylphenyl)cyclohexane, or a combination thereof. In an aspect, the third carbonate units are 1,1-bis (4-hydroxyphenyl)-3,3,5-trimethyl-cyclohexane (BPA TMC) carbonate units.

When the third carbonate units are present, the copolycarbonates can comprise 15 to 70 mol % of the bisphenol A carbonate units, 5 to 50 mol % of the second carbonate units, and 5 to 50 mol % of the third carbonate units, each based on the sum of moles of the bisphenol A carbonate units, second carbonate units, and third carbonate units. Optionally, the copolycarbonates comprise 30 to 60 mol % of the bisphenol A carbonate units, 5 to 35 mol % of the second carbonate units, 5 to 35 mol % of the third carbonate units, each based on the sum of the moles of the bisphenol A carbonate units, second carbonate units, and third carbonate units.

In an aspect, the copolycarbonates are highly random copolymers, which have less than 15 mol % or less than 10 mol % of the second carbonate units directly coupled to another second carbonate unit based on the total number of carbonate units in the copolycarbonates. The molar percent can be determined by nuclear magnetic resonance spectroscopy (NMR).

The high heat copolycarbonates can optionally have a weight average molecular weight of 10,000 to 50,000 Daltons (Da), e.g., 16,000 to 35,000 Da, or 27,000 to 33,000 Da, each as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute.

The high heat copoly carbonates can have a high glass transition temperature (Tg). The Tg of the high heat copolycarbonates can be 155 to 280° C., e.g., 165 to 260° C., e.g., 185 to 230° C., each as determined by differential scanning calorimetry (DSC) as per ASTM D3418 with a 20° C./min heating rate.

The high heat copoly carbonates can have high heat resistance. The heat deflection temperature (HDT) of the high heat copolycarbonates can be 145 to 270° C., or 175 to 220° C., measured flat on a 80×10×4 mm bar with a 64 mm span at 0.45 MPa according to ISO 75/Bf.

The high heat copolycarbonates can have high Vicat softening temperature. In an aspect, the high heat copolycarbonates can have a Vicat B120 of 150 to 275° C., or 160 to 255° C., or 180 to 225° C., measured according to ISO 306.

The high heat copoly carbonates can be present in an amount of 10 to 99 weight percent (wt %), 90 to 99.8 wt %, 20 to 80 wt %, 45 to 75 wt %, or 50 to 70 wt % based on the total weight of the polycarbonate compositions. The second carbonate units of the high heat copoly carbonates can optionally be present in the composition in an amount of 10 to 49 mol %, or 13 to 40 mol % or 35 to 49 mol %, or 18 to 35 mol % of second carbonate units based on sum of the moles of the copolycarbonate and the bisphenol A homopolycarbonate.

The polycarbonates can be manufactured by processes such as interfacial polymerization and melt polymerization, which are known, and are described, for example, in WO 2013/175448 A1 and WO 2014/072923 A1.

Including an acid stabilizer package in the polycarbonate compositions can further improve the color stability of the compositions, for example after the compositions are molded under aggressive conditions or after the compositions are aged at an elevated temperature for a prolonged period of time. The stabilizer package can comprise: a phosphorous-containing acid; an ester of a phosphorous-containing acid; and an organosulfonic stabilizer.

In an aspect, the phosphorous-containing acid and the ester of a phosphorous-containing acid are present in the stabilizer package in a molar ratio of 1 to 2.

In an aspect, the total stabilization package in the composition is optionally in the amount by weight of 4 to 32 parts per million by weight (ppm), 8 to 24 ppm, or 8 to 16 ppm.

The organosulfonic stabilizer is optionally 2 to 30 ppm, or 4 to 24 ppm, or 8 to 16 ppm of the polycarbonate composition.

Optionally the polycarbonate composition has a HDT at 0.45 MPa of 155° C. or higher, or 175° C. or higher, or 195° C. or higher as measured according to ASTM D648; and optionally, the polycarbonate composition optionally has a yellowness index of less than 20, or less than 10 as measured by ASTM D1925 on a 3.2 mm thick molded plaque.

In the stabilizer package, the phosphorous-containing acid can be $H_3PO_4$, $H_3PO_3$, or $H_3PO_2$, or a multi-nuclear phosphorous-containing acid such as pyrophosphoric, $H_3P_2O_7$, or a higher analog thereof, or a combination thereof.

In the stabilizer package, the ester of a phosphorous-containing acid can be a di- or tri-organically-substituted phosphite ester of the formula $(RO)_3$—P, a di- or tri-organically-substituted phosphate ester of the formula $(RO)_3$—P=O, or a combination thereof, in which R can be the same or different. In an aspect each R is independently a monovalent, divalent, or trivalent $C_{5-48}$ hydrocarbyl group or a halogen provided that at least two R are organic. Preferably each R is independently pentaerythrityl, 2,2-ethylidene-bis(4,6-di-tert-butylphenyl), octylphenyl, nonylphenyl, 2,4-di-tertiary-butylphenyl, or fluorine provided that at least two R are organic. The ester of the phosphorous-containing acid can be a sterically hindered phosphorous-containing stabilizer such as bis(2,4-di-tertiary-butylphenyl) pentaerythritol diphosphite, 2,2'-ethylidene-bis(4,6-di-t-butyl phenyl) fluorophosphite, tris(2,4-di-tertiary-butylphenyl) phosphite, or a combination thereof. Optionally, the ester of a phosphorous-containing acid is tris(2,4-di-t-butylphenyl)phosphite.

In an aspect, the organosulfonic stabilizer is represented by formula (8)

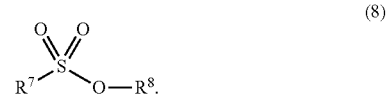

(8)

In formula (8), $R^7$ is each independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its corresponding $C_{1-32}$ alkyl ester. The $C_{2-32}$ ethylenically unsaturated aromatic sulfonic acid can be of the formula

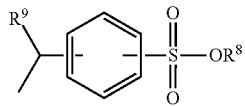

wherein $R^9$ is hydrogen or methyl, and $R^8$ is as defined in formula (8). Preferably the ethylenically unsaturated group and the sulfonic acid or ester group are located para on the phenyl ring.

Further in formula (8), $R^8$ is hydrogen; or $R^8$ is a $C_{1-30}$ alkyl; or $R^8$ is a group of the formula —S(=O)$_2$—$R^7$. When $R^8$ is a group of the formula —S(=O)$_2$—$R^7$, each $R^7$ in the compound of formula (8) can be the same or different, but preferably each $R^7$ is the same.

In an aspect in formula (8), $R^7$ is a $C_{6-12}$ aryl, $C_{7-24}$ alkylarylene, or a polymer unit derived from a $C_{2-14}$ ethylenically unsaturated aromatic sulfonic acid or its ester; and $R^8$ is hydrogen, $C_{1-24}$ alkyl, or a group of the formula —S(=O)$_2$—$R^7$ wherein $R^7$ is a $C_{6-12}$ aryl or $C_{7-24}$ alkylarylene.

In a preferred aspect, $R^7$ is a $C_{7-10}$ alkylarylene or a polymer unit derived from a $C_{2-14}$ ethylenically unsaturated aromatic sulfonic acid, and $R^8$ is a hydrogen, $C_{1-25}$ alkyl, or a group of the formula —S(=O)$_2$—$R^7$ wherein $R^7$ is a $C_{7-10}$ alkylarylene. In a specific aspect, $R^7$ is a $C_{710}$ alkylarylene and $R^8$ is a hydrogen or $C_{1-6}$ alkyl. In still another aspect, $R^7$ is a $C_{7-10}$ alkylarylene and $R^8$ is a hydrogen or $C_{12-25}$ alkyl, or $R^8$ is a $C_{14-20}$ alkyl.

In specific aspect, $R^7$ is a polymer unit derived from a $C_{2-14}$ ethylenically unsaturated aromatic sulfonic acid, preferably p-styrene sulfonic acid or para-methyl styrene sulfonic acid, such that in formula (8) $R^8$ is hydrogen.

In an aspect, the organosulfonic stabilizer is a $C_{1-10}$ alkyl ester of a $C_{7-12}$ alkylarylene sulfonic acid, preferably of p-toluene sulfonic acid. More preferably the stabilizer is a $C_{1-6}$ alkyl ester of p-toluene sulfonic acid, and even more preferably is butyl tosylate.

In another aspect, the organosulfonic stabilizer is an anhydride of a $C_{7-12}$ alkylarylene sulfonic acid, preferably para-toluene sulfonic anhydride.

In still another aspect, $R^7$ is a $C_{1-24}$ alkylarylene sulfonic acid, and $R^8$ is hydrogen. Alternatively, $R^7$ is a $C_{16-22}$ alkylarylene sulfonic acid, and $R^8$ is hydrogen.

The acid stabilizer can be used, e.g., in an amount of 2 parts per million by weight (ppm) to 25 ppm, or 4 ppm to 15 ppm, or 6 ppm to 12 ppm, or 1 ppm to 40 ppm, or 4 ppm to 20 ppm, or 6 ppm to 10 ppm by weight, each based on the total weight of the polycarbonate composition.

The polycarbonate compositions can include various additives ordinarily incorporated into polymer compositions of this type, with the proviso that the additive(s) are selected so as to not significantly adversely affect the desired properties of the polycarbonate composition, in particular melt flow, thermal, transparency, and surface properties, and which preferably do not interfere with the stabilizer package. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as titanium dioxide, carbon black, and organic dyes, surface effect additives, radiation stabilizers, flame retardants, anti-drip agents, and impact modifiers. In an aspect, the polycarbonate composition further comprises a processing aid, a heat stabilizer, an ultraviolet light absorber, a colorant, a flame retardant, an impact modifier, or a combination thereof. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0 to 5 wt % or 0.01 to 5 wt %, based on the total weight of the polycarbonate composition.

In another aspect, the copolycarbonates and copolycarbonate compositions contain at least one additional heat stabilizer or antioxidant, each at loading of 0.01 to 0.1 parts per hundred of the composition excluding the stabilizer package (pph). Exemplary antioxidant additives include organophosphites such as tris(nonyl phenyl)phosphite, tris (2,4-di-t-butylphenyl)phosphite, bis(2,4-di-t-butylphenyl) pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid; or combinations comprising at least one of the foregoing antioxidants. Exemplary heat stabilizer additives include organophosphites such as triphenyl phosphite, tris-(2,6-dimethylphenyl)phosphite, and tris-(mixed mono- and di-nonylphenyl)phosphite; phosphonates such as dimethylbenzene phosphonate; phosphates such as trimethyl phosphate; or combinations comprising at least one of the foregoing heat stabilizers.

Light stabilizers, including ultraviolet light (UV) absorbers, can also be used. Light stabilizers include benzotriazoles such as 2-(2-hydroxy-5-methylphenyl)benzotriazole and 2-(2-hydroxy-5-tert-octylphenyl)-benzotriazole, 2-hydroxy-4-n-octoxy benzophenone, or combinations comprising at least one of the foregoing light stabilizers. UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2, 4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3, 3-diphenylacryloyl)oxy]methyl]propane (UVINUL™ 3030); 2,2'-(1, 4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; phenol, 2-(2H-benzotriazol-2-yl)-4,6-bis(1-methyl-1-phenylethyl) (TINUVIN™ 234); BCAP bismalonate from Clariant; nano-size inorganic materials such as titanium oxide, cerium oxide, and zinc oxide, all with particle size less than or equal to 100 nanometers; or combinations comprising at least one of the foregoing UV absorbers. Light stabilizers are used in amounts of 0.01 to 5 parts by weight, based on 100 parts by weight of the polycarbonate composition, excluding any filler.

Flame retardants can also be used. Flame retardants include flame retardant salts such as alkali metal salts of perfluorinated $C_{1-16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, or $Na_3AlF_6$ or the like. Rimar salt and KSS and NATS, alone or in combination with other flame retardants, are particularly useful in the compositions disclosed herein. Flame retardant salts are typically used in amounts of 0.01 to 1.0 parts by weight, based on 100 parts by weight of the polycarbonate composition.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

The polycarbonate compositions can optionally have a glass transition temperature of 155° C. or higher, e.g., 155°

C. to 280° C., or 165° C. to 260° C., or 185° C. to 230° C., determined by differential scanning calorimetry (DSC) as per ASTM D3418 with a 20° C./min heating rate.

The polycarbonate compositions can have high heat resistance. The heat deflection temperature (HDT) of the polycarbonate compositions can be 150° C. or higher, e.g., 150 to 270° C., or 155 to 260° C., or 175 to 220° C., measured flat on a 80×10×4 mm bar with a 64 mm span at 0.45 MPa according to ISO 75/Bf.

The polycarbonate compositions can have high Vicat softening temperature. In an aspect, the polycarbonate compositions have a Vicat B120 of a Vicat B120 of 155° C. or higher, preferably 165° C. or higher, more preferably 180° C. or higher as measured according to ISO 306.

The polycarbonate compositions can have good transparency. In an aspect, the polycarbonate compositions have a haze less of less than 1.5, or less than 1.0, or less than 0.5%, and a transmission greater than 86%, or greater than 88%, or greater than 89%, or greater than 90%, each measured according to ASTM D1003-00 using the color space CIE1931 (Illuminant C and a 2° observer) with a 1.0 mm thickness. The polycarbonate compositions can have a haze of less than 1.5, or less than 1.0 and a total transmission greater than 84% or greater than 86%, each measured according to ASTM D1003-00 using the color space CIE1931 (Illuminant C and a 2° observer) on a molded plaque with a 3.0 mm thickness. The polycarbonate compositions are molded under standard molding conditions in range of 300 to 350° C. depending on the glass transition temperature of the composition. For example, the polycarbonate compositions are molded at a temperature of 100° C. to 175° C. above the glass transition temperature of the poly carbonate composition for a residence time of 2 to 20 minutes.

The polycarbonate compositions can have good transparency in the infrared wavelength range. In an aspect, the polycarbonate compositions have a transmission at wavelength of 940 nm of greater than 88%, or greater than 89% or greater than 90% measured with Perkin Elmer 950 spectrometer equipped with 15 cm integrated sphere on a molded plaque with a thickness of 1 mm; and a refractive index of greater than 1.59 or greater than 1.60 at 587.6 nm or a refractive index of greater than 1.57 or greater than 1.58 at 940 nm measured according to IS 489 on a molded plaque with a thickness of 1 mm. The compositions can have a transmission at wavelength of 840 nm of greater than 88.0%, preferably greater than 89.0%, more preferably greater than 90.0%, as measured with Perkin Elmer 950 spectrometer equipped with 15 cm integrated sphere on 1 mm. The compositions have a transmission at wavelength of 550 nm of greater than 85%, or greater than 87% or greater than 88% measured with Perkin Elmer 950 spectrometer equipped with 15 cm integrated sphere on a molded plaque with a thickness of 1 mm; and the compositions can have a transmission at wavelength of 400 nm of greater than 75%, or greater than 80% or greater than 85% measured with Perkin Elmer 950 spectrometer equipped with 15 cm integrated sphere on a molded plaque with a thickness of 1 mm. In still another aspect, the compositions have a transmission at wavelength of 1310 nm of greater than 87%, preferably greater than 88.0%, more preferably greater than 89.0%, as measured with Perkin Elmer 950 spectrometer equipped with 15 cm integrated sphere on 1 mm.

The polycarbonate compositions can have an Abbe number of less than 32 or less than 30 measured according to ISO 489 on a molded plaque with a thickness of 1 mm.

The polycarbonate compositions can have a melt volume flow rate (MVR) greater than 10 cc/min or greater than 12 cc/min or greater than 15 cc/min, measured at 330° C./2.16 Kg at 360 second dwell according to ISO 1133.

The polycarbonate compositions can have an Izod notched impact energy of at least 6 kJ/m$^2$, or of at least 8 kJ/m$^2$, as measured at 23° C. according to ISO 180/1A using a multipurpose test specimen in accordance with ISO 3167 TYPE A. The polycarbonate compositions can have an Izod notched impact energy of at least 70 J/m, or of at least 88 J/m, as measured at 23° C. according to ASTM D256.

The polycarbonate compositions can have good flame retardant properties. Flammability tests are performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as HB, V0, UL94 V1, V2, VA or VB. In an aspect, the polycarbonate compositions have a UL94-V0 rating at a thickness of 2.5 mm or higher; or a UL94-V2 rating at a thickness of 0.8 mm to 1.5 mm.

In an aspect, the copolycarbonate can comprise from 51 to 90 mol % of the bisphenol A carbonate units and 10 to 49 mol % of the second carbonate units, each based on the total number of carbonate units in the copolycarbonate.

In an aspect, in the stabilizer package, a) the phosphorous-containing acid can be $H_3PO_4$;

b) the ester of the phosphorous-containing acid can be tris(2,4-di-t-butylphenyl)phosphite; and c) the organosulfonic stabilizer can be butyl tosylate.

In an aspect, the copolycarbonate can comprise less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography.

In an aspect, the copolycarbonate composition can have a bisphenol A purity of at least 99.6%, or at least 99.7%, as determined by high performance liquid chromatography. The purity can be defined as 100 wt % minus the sum of known and unknown impurities detected using UV (see high performance liquid chromatography (HPLC) method in Nowakowska et al., Polish J. Appl. Chem., XI(3), 247-254 (1996)). In an aspect, at least one of the bisphenol A carbonate units and the bisphenol A homopolycarbonate can have a sulfur level of less than or equal to 2 ppm as measured by a commercially available total sulfur analysis based on combustion and coulometric detection. A combination of the two foregoing properties can be present.

In an aspect, the copolycarbonate can further comprise at least 5 mol % of third carbonate units different from the bisphenol A carbonate units and the second carbonate unit, based on the total number of carbonate units in the copolycarbonate, the third carbonate units comprising carbonate units of the formula:

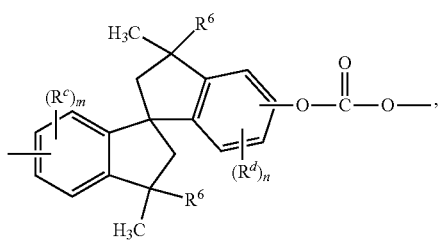

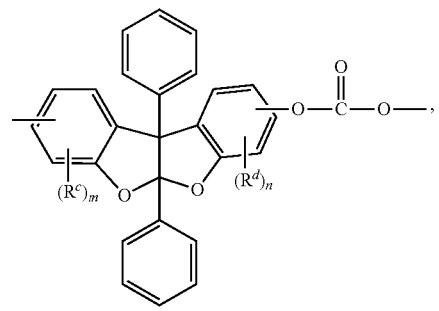

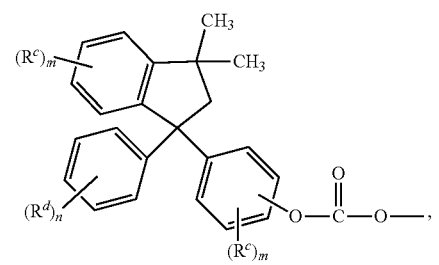

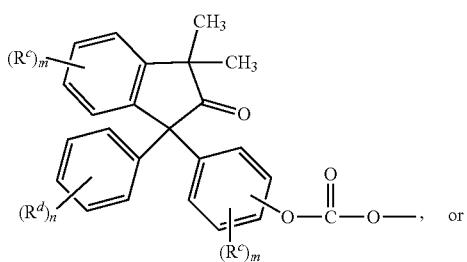

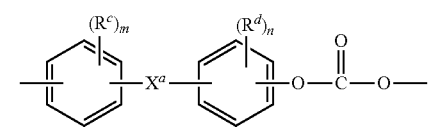

wherein
$R^c$ and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or poly cycloalkylidene, -$(Q^1)_x$-G-$(Q^2)_y$-group wherein $Q^1$ and $Q^2$ are each independently a $C_{1-3}$ alkylene, G is a $C_{3-10}$ cycloalkylene, x is 0 or 1, and y is 1, or —C($P^1$)($P^2$)— wherein $P^1$ is $C_{1-12}$ alkyl and $P^2$ is $C_{6-12}$ aryl, and m and n are each independently 0 to 4, or a combination thereof.

In an aspect, the third carbonate units can have the formula

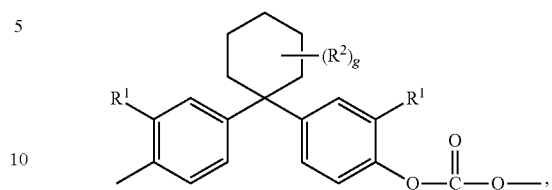

wherein
each $R^1$ is independently hydrogen or methyl,
each $R^2$ is independently methyl or hydrogen, and
g is 0 to 2.

In an aspect, the copolycarbonate can comprise from 15 mole percent (mol %) to 70 mol % of the bisphenol A carbonate units, 5 to 50 mol % of the second carbonate units, and 5 to 50 mol % of the third carbonate units, each based on the total number of carbonate units in the copolycarbonate.

The polycarbonate compositions can be provided as pellets, and are useful to form articles by a variety of methods. All known methods can be used. Exemplary methods include via multi-cavity tools; molding such as injection molding, gas assist injection molding, vacuum molding, extrusion, compression molding, calendaring, rotary molding, heat/cool molding, blow molding, overmolding, transfer molding, cavity molding, thermoforming, or casting.

In an aspect, an article comprising the copolycarbonate composition can have no significant part distortion or discoloration when the article is subjected to a secondary operation comprising over-molding, lead-free soldering, wave soldering, low temperature soldering, or coating, or a combination thereof. As used herein "significant part distortion" can mean distortion observable by the naked eye; or means less than 20%, or less than 10%, or less than 5% or less than 3%, preferably less than 1% variation in any single length, width, height, curvature, or surface flatness of the article. "No significant discoloration" means less than 10%, less than 5%, or less than 3% change in color, e.g., YI as described above, or CIELAB color. In particular, the article can have less than 20% variation in a length, width, a height, a curvature, or a surface flatness of the article, and less than 10% change in yellowness index according to ASTM D1925 when the article is subjected to a secondary operation comprising over-molding, lead-free soldering, wave soldering, low temperature soldering, coating, or a combination thereof.

One or more surfaces of the article can be partially or completely coated with a hard coat, a UV protective coat, an anti-refractive coat, an anti-reflective coat, a scratch resistant coat, or a combination comprising at least one of the foregoing or metallized.

In an aspect, the article can be a component of a device comprising a lens, a device comprising a light guide, a device comprising a waveguide, a device comprising a collimator, a device comprising an optical fiber, a device comprising a lighting element, a device comprising a window, a device comprising a door, or the article is a structural component of a vehicle, a building, or an appliance, or the article is a component of a medical device, a component of a display screen, a component of an electronic device, a component of a safety device, a component of a screen, a component of conveyor, a component of a mold, a component of a dish, a component of an enclosure, a component of packaging, a component of a gas barrier, a component of an encapsulant, a component of a label, a component of a gas barrier, a component of an anti-fog assembly, or a component of an anti-reflective assembly.

EXAMPLES

Components used in the Examples and Comparative Examples are provided in Table 1.

TABLE 1

| Component | Description | Supplier |
|---|---|---|
| PC1 | Polycarbonate of Bisphenol A (BPA), Mw = 29,000 to 31,000 Da | SABIC |
| PC2 | Polycarbonate copolymer made from BPA and PPPBP (N-phenyl phenolphthalein), PPPBP 30-35 mol % of total BPA and PPPBP | SABIC |
| PC3 | Polycarbonate copolymer made from BPA and PPPBP (N-phenyl phenolphthalein) (45 mol % PPPBP) | SABIC |
| MR | Mold release agent: pentaerythritol tetrastearate | LONZA Spa |
| ST1 | Stabilizer: tris(2,4-di-t-butylphenyl)phosphite from CIBA + phosphorous acid in PC2 as concentrate | CIBA |
| ST2 | Stabilizer: n-butyl tosylate in PC2 as concentrate | Sigma Aldrich |
| ST3 | Stabilizer: octadecyl-3-(3,5, di-tert-butyl-4-hydroxyphenyl)propionate | CIBA/ BASF |
| ST4 | Stabilizer: tris(2,4-di-t-butylphenyl)phosphite | CIBA |
| ST5 | Phosphorous acid | |
| ST6 | Stabilizer: n-butyl tosylate in PC3 as concentrate | |

The stabilizer 1 and 2 (ST1 and ST2) were blended with powder of polycarbonate copolymer made from BPA and PPPBP to make a concentrate and then used in the formulation.

To prepare ST1 in Table 1, 1.8 grams of tris(2,4-di-t-butylphenyl)phosphite and 0.11 grams of phosphorous acid were added into 98 grams of PPPBP-BPA copolycarbonate powder, then the mixture was blended using a paint shaker for over 5 minutes. The molar ratio of tris(2,4-di-t-butylphenyl)phosphite to phosphorous acid is 2 to 1. The ST2 in Table 1 was made by blending 1.197 grams of n-butyl tosylate into 379 grams of PPPBP-BPA copolycarbonate powder using a paint shaker.

The compositions were made as follows. All solid were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid additives, if any, were fed before the vacuum using a liquid injection system. It will be recognized by one skilled in the art that the method is not limited to these processing steps or processing equipment.

Extrusion of all materials was performed on a 25 mm Werner-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), 270° C. (zone 3), and 290-330° C. (zones 4 to 8). Screw speed was 300 revolutions per minute (rpm) and throughput was between 10 and 25 kg/hr. It will be recognized by one skilled in the art that the method is not limited to these temperatures or processing equipment.

For testing, color plaques (60×60×2.0 millimeters (mm)) were prepared by drying the compositions at 135° C. for 4 hours, then by molding after on a 45-ton Engel molding machine with 22 mm screw or 75-ton Engel molding machine with 30 mm screw operating at a temperature around 310-360° C. with a mold temperature of 80-100° C. Melt temperatures and residence times in the barrel of the molding machine were varied to assess the effect of molding under more extreme conditions compared to relatively mild conditions. It will be recognized by one skilled in the art that the method is not limited to these temperatures or processing equipment.

Yellowness Index (YI) was calculated from the transmission spectrum from a MacBeth ColorEye7000A according to ASTM D1925, at 3.2 mm thickness.

Melt volume flow rate (MVR) was measured at 330° C./2.16 Kg at 360 second dwell according to ISO 1133, with results provided in units of cm³/10 minutes.

Tensile Modulus and Tensile Strength at Yield were measured in accordance with ASTM D638, with results provided in unites of MPa.

The heat deflection temperature (HDT) was measured in accordance with ASTM D648 at conditions of a 3.2 mm span at 0.45 MPa, with results provided in units of ° C.

The compositions of the Examples and Comparative Examples are shown in the tables below, together with their measured characteristics. The amount of each component is in weight percent, based on the total weight of the composition, and totals 100 weight percent.

The formulations and properties of the Comparative Examples 1 through 6 are shown in Table 2. In Comparative Examples 1 and 2, only one stabilizer package was added, either ST1 or ST2. In Comparative Examples 3 through 6, various combinations of stabilizer packages were blended in the formulations while maintaining roughly the same total loading of stabilizers. Table 3 shows the physical and mechanical properties of the molded parts from formulation Comparative Examples 1 through 6.

TABLE 2

| Component | C1 | C2 | C3 | C4 | C5 | C6 |
|---|---|---|---|---|---|---|
| PC1 | 99.394 | 99.82 | 99.607 | 99.500 | 99.714 | 99.500 |
| ST1 | | 0.08 | 0.04 | 0.02 | 0.06 | 0.02 |
| ST2 | 0.506 | | 0.253 | 0.3795 | 0.1265 | 0.3795 |
| MR | 0.1 | 0.1 | 0.1 | 0.1 | 0.1 | 0.1 |
| | | | | | | |
| Total | 100 | 100 | 100 | 100 | 100 | 100 |
| Tris(2,4-di-t-butylphenyl)phosphite + phosphorous acid (ppm) | | 15.3 | 7.65 | 3.825 | 11.475 | 3.825 |
| Butyl tosylate (ppm) | 15.9 | | 7.95 | 11.925 | 3.975 | 11.925 |
| Total effective stabilizer (ppm) | 15.9 | 15.3 | 15.6 | 15.75 | 15.45 | 15.75 |

TABLE 2-continued

| Property | C1 | C2 | C3 | C4 | C5 | C6 |
|---|---|---|---|---|---|---|
| Yellowness Index | 2.59 | 2.32 | 2.47 | 2.49 | 2.43 | 2.43 |
| MVR | 26.6 | 26.9 | 26.3 | 26.6 | 26.4 | 26.2 |
| Tensile Modulus | 2180 | 2168 | 2176 | 2172 | 2164 | 2170 |
| Tensile Strength at Yield | 60.8 | 60.5 | 60.6 | 60.7 | 60.8 | 60.8 |
| HDT | 143.5 | 143.4 | 143.2 | 143.1 | 143.1 | 143.2 |

As can be observed in Table 2, various combinations of STT and ST2 performed about the same as either STT or ST2 alone in terms of stabilizing the color. And as expected, other physical and mechanical properties of Comparative Examples 1 through 6 are not affected by variations in stabilization package.

Table 3 lists the formulation details and properties of Comparative Examples 7 and 8 and Examples 1 through 3. Each of Comparative Examples 7 and 8 contained one stabilizer of STT or ST2, while Examples 1 through 3 had a combination of stabilizers of STT and ST2. All formulations had a third long term stabilizer ST3. The hindered phenol stabilizer ST3 was added into the formulation before extrusion.

TABLE 3

| Component | C7 | C8 | E1 | E2 | E3 |
|---|---|---|---|---|---|
| PC2 | 99.42 | 99.82 | 99.607 | 99.500 | 99.714 |
| ST1 | | 0.06 | 0.03 | 0.02 | 0.04 |
| ST2 | 0.38 | | 0.19 | 0.253 | 0.127 |
| ST3 | 0.1 | 0.1 | 0.1 | 0.1 | 0.1 |
| MR | 0.1 | 0.1 | 0.1 | 0.1 | 0.1 |
| Total | 100 | 100 | 100 | 100 | 100 |
| Tris(2,4-di-t-butylphenyl)phosphite + phosphorous acid (ppm) | | 11.5 | 5.75 | 3.83 | 7.67 |
| Butyl tosylate(ppm) | 12 | | 6 | 8 | 4 |
| Total effective stabilizer (ppm) | 12 | 11.5 | 11.75 | 11.83 | 11.67 |

TABLE 3-continued

| Component | C7 | C8 | E1 | E2 | E3 |
|---|---|---|---|---|---|
| Description | C7 | C8 | E1 | E2 | E3 |
| Yellowness Index | 24.7 | 23.38 | 17.99 | 17.36 | 17.96 |
| MVR | 22.9 | 24.3 | 21.1 | 20.7 | 21.6 |
| Tensile Modulus | 2494 | 2492 | 2470 | 2442 | 2480 |
| Tensile Strength at Yield | 79.4 | 79.4 | 79.5 | 79.2 | 79.1 |
| HDT | 184.7 | 185 | 184.1 | 182.3 | 184 |

The samples of Examples 1 through 3 had lower YI compared with those of Comparative Examples 7 and 8 while other physical and mechanical properties remained about the same, which indicates that a combination of ST1 and ST2 are better than either one alone at roughly the same loading. And the improved effect was seen in the formulations with polycarbonate copolymers, while not in the formulation with homopolycarbonate as in Comparative Examples 1 through 6.

Table 4 lists the formulation details and properties of Comparative Examples 9 and 10 and Examples 4 through 7. Each of Comparative Examples 9 and 10 contained one stabilizer of ST1 or ST2, while Examples 4 through 7 had a combination of stabilizers of ST1 and ST2. Comparative Examples 9 and 10 and Examples 4 through 6 contained a third long term stabilizer ST3.

TABLE 4

| Component | C9 | C10 | E4 | E5 | E6 | E7 |
|---|---|---|---|---|---|---|
| PC2 | 99.294 | 99.72 | 99.507 | 99.400 | 99.614 | 99.500 |
| ST1 | | 0.08 | 0.04 | 0.02 | 0.06 | 0.02 |
| ST2 | 0.506 | | 0.253 | 0.3795 | 0.1265 | 0.3795 |
| ST3 | 0.1 | 0.1 | 0.1 | 0.1 | 0.1 | |
| MR | 0.1 | 0.1 | 0.1 | 0.1 | 0.1 | 0.1 |
| Total | 100 | 100 | 100 | 100 | 100 | 100 |
| Tris(2,4-di-t-butylphenyl)phosphite + phosphorous acid (ppm) | | 15.3 | 7.65 | 3.825 | 11.475 | 3.825 |
| Butyl tosylate (ppm) | 15.9 | | 7.95 | 11.925 | 3.975 | 11.925 |
| Total effective stabilizer (ppm) | 15.9 | 15.3 | 15.6 | 15.75 | 15.45 | 15.75 |
| Description | C9 | C10 | E4 | E5 | E6 | E7 |
| Yellowness Index | 12.13 | 11.94 | 8.72 | 7.56 | 8.88 | 7.37 |
| MVR | 18.3 | 18.1 | 17.4 | 18.7 | 16 | 16.8 |
| Tensile Modulus | 2466 | 2446 | 2490 | 2482 | 2480 | 2468 |
| Tensile Strength at Yield | 79.1 | 79.1 | 79.5 | 79.4 | 79.3 | 78.9 |
| HDT | 186.1 | 186.5 | 185.5 | 186.2 | 186.3 | 187.3 |

The samples of Examples 4 through 7 had lower YI compared with those of Comparative Examples 9 and 10 while other physical and mechanical properties remained about the same, which indicates that a combination of ST1 and ST2 are better than either one alone in the combination at roughly the same loading. The improved effect was present in the formulations with PPPBP-BPA copolycarbonate, while not in the formulation with homo polycarbonate as in Comparative Examples 1 through 6. And by comparing the result of Example 7 with Examples 4 through 6, the synergistic effect presents with and without the presence of ST3 in the formulation.

Table 5 lists the formulation details and properties of Comparative Examples 11-12 and Examples 8-9, all which contain 12 ppm butyl tosylate, but differ in the molar ratio of ST4 to ST5.

TABLE 5

| Component | Unit | C11 | C12 | E8 | E9 |
|---|---|---|---|---|---|
| PC3 | wt % | 99.09 | 99.1896 | 99.507 | 99.4005 |
| MR | wt % | 0.3 | 0.3 | 0.04 | 0.02 |
| ST6 | wt % | 0.41 | 0.41 | 0.41 | 0.41 |
| ST4 | wt % | 0.1 | 0.1 | 0.1 | 0.05 |
| ST5 | wt % | 0.1 | 0.0004 | 0.00634 | 0.00317 |
| Total | wt % | 100 | 100 | 100 | 100 |
| ST4 to ST5 molar ratio | | 0.127 | 31.7 | 2 | 2 |
| Butyl tosylate | ppm | 12 | 12 | 12 | 12 |
| Description | | C11 | C12 | E8 | E9 |
| Yellowness Index | | — | 5.22 | 4.85 | 4.36 |
| MVR | cm³/10 min | — | 16.7 | 17.8 | 13.8 |
| Tensile Modulus | MPa | — | 2646 | 2554 | 2714 |
| Tensile Strength at Yield | MPa | — | 87.2 | 87.1 | 87.2 |
| HDT | ° C. | — | 200.5 | 200.3 | 200.8 |

For Comparative Examples 11 and 12, the molar ratio of ST4 to ST5 was 0.127 and 31.7, respectively, whereas for Examples 8-9, the molar ratio of ST4 to ST5 was 2. For Comparative Example 11 where the molar ratio of ST4/ST5 was 0.127, the extrudates were extremely yellow and brittle due to degradation caused by high levels of phosphorous acid; and no quality parts could be made by an injection molding process for testing and no meaningful MVR data could be generated. For Comparative Example 12 where the molar ratio of ST4/ST5 was 31.7, the YI was 5.22 higher than those of Examples 8 and 9 in which the ST4/ST5 molar ratio was 2.

This disclosure further encompasses the following aspects.

Aspect 1. A copolycarbonate composition comprising: a copolycarbonate comprising bisphenol A carbonate units and second carbonate units of the formula

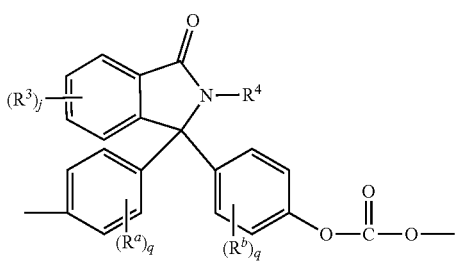

wherein $R^a$ and $R^b$ are each independently a $C_{1-12}$ alkyl, $C_{1-12}$ alkenyl, $C_{3-8}$ cycloalkyl, or $C_{1-12}$ alkoxy, each $R^3$ is independently a $C_{1-6}$ alkyl, $R^4$ is hydrogen, $C_{2-6}$ alkyl, or phenyl optionally substituted with 1 to 5 $C_{1-6}$ alkyl groups, p, q, and j are each independently 0 to 4; and optionally, a bisphenol A homopolycarbonate; wherein the second carbonate units are present optionally in an amount of 10 to 49 mol %, or 13 to 49 mol %, or 25 to 49 mol %, based on the sum of the moles of the copolycarbonate and the bisphenol A homopolycarbonate; and wherein the composition further comprises a stabilizer package comprising: a phosphorous-containing acid; an ester of a phosphorous-containing acid; and an organosulfonic stabilizer; wherein the phosphorous-containing acid and the ester of the phosphorous-containing acid are present in the stabilizer package in a molar ratio of 1 to 2; wherein the total stabilization package in the composition is optionally in the amount by weight of 4 to 32 ppm, 8 to 24 ppm, or 8 to 16 ppm; wherein the organosulfonic stabilizer is optionally 2 to 30 ppm, or 4 to 24 ppm, or 8 to 16 ppm of the polycarbonate composition; wherein optionally the polycarbonate composition has a heat deformation temperature at 0.45 megapascals of 155° C. or higher, or 175° C. or higher, or 195° C. or higher as measured according to ASTM D648; and wherein the polycarbonate composition optionally has a yellowness index of less than 20, or less than 10 as measured by ASTM D1925 on a 3.2 millimeter thick molded plaque.

Aspect 2. The copolycarbonate composition of Aspect 1, further comprising 0.01 to 0.1 parts per hundred each of at least one antioxidant or heat stabilizer additive, or a combination thereof.

Aspect 3. The copolycarbonate composition of Aspects 1 or 2, wherein the second carbonate repeating units in the copolycarbonate are of the formula (1a), wherein $R^5$ is hydrogen, phenyl, or methyl, preferably wherein $R^5$ is phenyl.

Aspect 4. The copolycarbonate composition of any of Aspects 1-3, wherein the total stabilization package in the composition is in the amount by weight of 8 to 16 ppm; wherein the organosulfonic stabilizer is 2 to 30 ppm, or 4 to 24 ppm, or 8 to 16 ppm of the polycarbonate composition; wherein optionally the polycarbonate composition has a heat deformation temperature at 0.45 MPa of 155° C. or higher, or 175° C. or higher, or 195° C. or higher as measured according to ASTM D648; and wherein the polycarbonate composition optionally has a yellowness index of less than 20, or less than 10 as measured by ASTM D1925 on a 3.2 millimeter thick molded plaque.

Aspect 5. The copolycarbonate composition of any of Aspects 1-4, wherein the total stabilization package in the composition is in the amount by weight of 4 to 32 ppm, 8 to 24 ppm, or 8 to 16 ppm; wherein the organosulfonic stabilizer is 8 to 16 ppm of the polycarbonate composition; wherein the polycarbonate composition has a heat deformation temperature at 0.45 megapascals of 155° C. or higher, or 175° C. or higher, or 195° C. or higher as measured according to ASTM D648; and wherein the polycarbonate composition has a yellowness index of less than 20, or less than 10 as measured by ASTM D1925 on a 3.2 millimeter thick molded plaque.

Aspect 6. The copolycarbonate composition of any of Aspects 1-5, wherein, in the stabilizer package: a) the phosphorous-containing acid is $H_3PO_4$, $H_3PO_3$, $H_3PO_2$, a multi-nuclear phosphorous-containing acid such as pyrophosphoric, $H_3P_2O_7$, a higher analog thereof, or a combination thereof; b) the ester of the phosphorous-containing acid is a di- or tri-organically-substituted phosphite ester of the formula (RO)₃—P, a di- or tri-organically-substituted phosphate ester of the formula (RO)₃—P=O, or a combination thereof, wherein each R is independently a monovalent, divalent, or trivalent $C_{5-36}$ hydrocarbyl group or a halogen provided that at least two R are organic, preferably wherein each R is independently pentaerythrityl, 2,2-ethylidene-bis(4,6-di-tert-butylphenyl), octylphenyl, nonylphenyl, 2,4-di-tertiary-butylphenyl, or fluorine provided that at least two R are organic; and c) the organosulfonic stabilizer has the formula

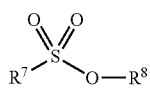

wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen; or $R^8$ is a $C_{1-30}$ alkyl; or R is a group of the formula —S(=O)₂—$R^7$.

Aspect 7. The copolycarbonate composition of any of Aspects 1-6, wherein, in the stabilizer package: a) the phosphorous-containing acid is $H_3PO_4$, $H_3PO_3$, $H_3PO_2$, a multi-nuclear phosphorous-containing acid such as pyrophosphoric, $H_3P_2O_7$, a higher analog thereof, or a combination thereof; b) the ester of the phosphorous-containing acid is a sterically hindered phosphorous-containing stabilizer, preferably bis(2,4-di-tert-butylphenyl) pentaerythritol diphosphite, 2,2'-ethylidene-bis(4,6-di-t-butyl phenyl) fluorophosphite, and tris(2,4-di-tert-butylphenyl) phosphite; tris-(nonylphenyl)phosphite, and c) the organosulfonic stabilizer has the formula

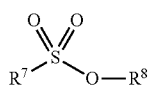

wherein each $R^7$ is a $C_{7-30}$ alkylarylene; and $R^8$ is a $C_{1-5}$ alkyl.

Aspect 8. The copolycarbonate composition of any one of Aspects 1-7, wherein the copolycarbonate comprises from 51 to 90 mol % of the bisphenol A carbonate units and 10 to 49 mol % of the second carbonate units, each based on the total number of carbonate units in the copoly carbonate.

Aspect 9. The copolycarbonate composition of any one of Aspects 1-8, wherein in the stabilizer package a) the phosphorous-containing acid is $H_3PO_4$; b) the ester of the phosphorous-containing acid is tris(2,4-di-t-butylphenyl)phosphite; and c) the organosulfonic stabilizer is butyl tosylate.

Aspect 10. The copolycarbonate composition of any one of Aspects 1-9, wherein in the stabilizer package a) the phosphorous-containing acid is $H_3PO_4$; b) the ester of the phosphorous-containing acid is tris(2,4-di-t-butylphenyl) phosphite; and c) the organosulfonic stabilizer is butyl tosylate.

Aspect 11. The copolycarbonate composition of any of Aspects 1-10, wherein the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography.

Aspect 12. The copolycarbonate composition of any of Aspects 1-11, wherein the copolycarbonate composition has a bisphenol A purity of at least 99.6%, or at least 99.7%, as determined by high performance liquid chromatography.

Aspect 13. The copolycarbonate composition of any of Aspects 1-12, wherein at least one of the bisphenol A carbonate units and the bisphenol A homopolycarbonate has a sulfur level of less than or equal to 2 ppm as measured by a total sulfur analysis based on combustion and coulometric detection.

Aspect 14. The copolycarbonate composition of any of Aspects 1-14, wherein the copolycarbonate further comprises at least 5 mol % of third carbonate units different from the bisphenol A carbonate units and the second carbonate unit, based on the total number of carbonate units in the copolycarbonate, the third carbonate units comprising carbonate units of the formula:

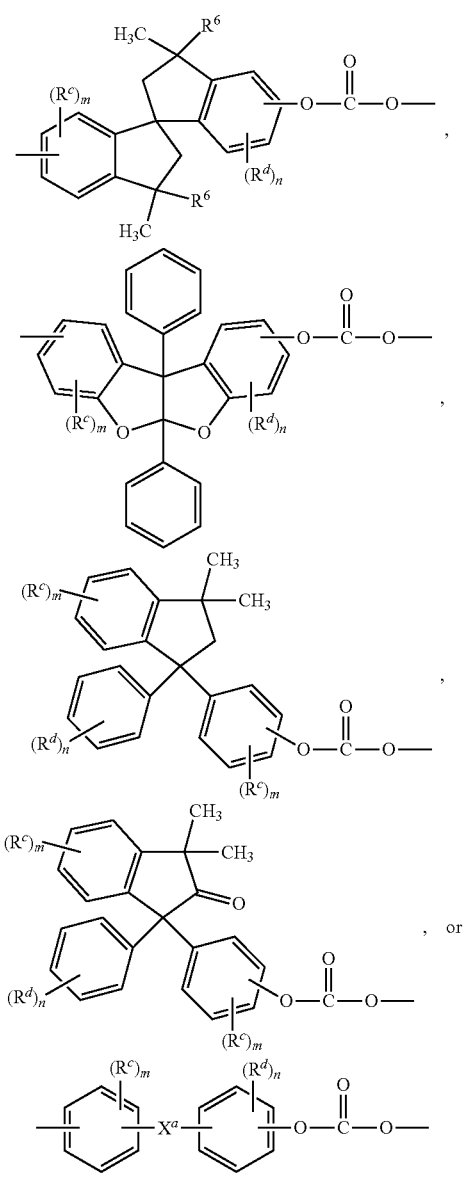

wherein $R^c$ and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or polycycloalkylidene, -(Q¹)ₓ-G-(Q²)ᵧ-group wherein Q¹ and Q² are each independently a $C_{1-3}$ alkylene, G is a $C_{3-10}$ cycloalkylene, x is 0 or 1, and y is 1, or —C(P¹)(P²)— wherein P¹ is $C_{1-12}$ alkyl and P² is $C_{6-12}$ aryl, and m and n are each independently 0 to 4, or a combination thereof.

Aspect 15. The copolycarbonate composition of Aspect 14, wherein the third carbonate units have the formula

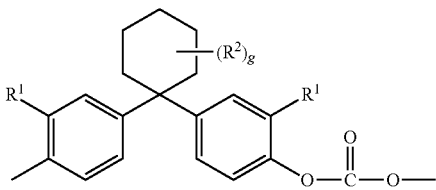

wherein each R¹ is independently hydrogen or methyl, each R² is independently methyl or hydrogen, and g is 0 to 2.

Aspect 16. The copolycarbonate composition of Aspect 14 or Aspect 15, wherein the copolycarbonate comprises from 15 to 70 mol % of the bisphenol A carbonate units, 5 to 50 mol % of the second carbonate units, and 5 to 50 mol % of the third carbonate units, each based on the total number of carbonate units in the copolycarbonate.

Aspect 19. An article comprising the copolycarbonate composition of any of Aspects 1 to 16, wherein the article is a component of a camera, electronic device, vehicle, flashlight, business machine, lighting device, imaging device, protective article, vision corrective article, or toy.

Aspect 20. An article comprising the copolycarbonate composition of any one of Aspects 1-19, wherein the article has less than 20% variation in a length, width, a height, a curvature, or a surface flatness of the article, or less than 10% change in yellowness index according to ASTM D1925 when the article is subjected to a secondary operation comprising over-molding, lead-free soldering, wave soldering, low temperature soldering, or coating, or a combination thereof;

Aspect 21. The article of Aspect 19 or Aspect 20, wherein or one or more surfaces of the article are partially or completely coated with a hard coat, a UV protective coat, an anti-refractive coat, an anti-reflective coat, a scratch resistant coat, or a combination comprising at least one of the foregoing or metallized.

Aspect 22. The article of any of Aspects 19-21, wherein the article is a component of a device comprising a lens, a device comprising a light guide, a device comprising a waveguide, a device comprising a collimator, a device comprising an optical fiber, a device comprising a lighting element, a device comprising a window, a device comprising a door, or the article is a structural component of a vehicle, a building, or an appliance, or the article is a component of a medical device, a component of a display screen, a component of an electronic device, a component of a safety device, a component of a screen, a component of conveyor, a component of a mold, a component of a dish, a component of an enclosure, a component of packaging, a component of a gas barrier, a component of an encapsulant, a component of a label, a component of a gas barrier, a component of an anti-fog assembly, or a component of an anti-reflective assembly; preferably wherein the article is a component of a camera, an electronic device, a vehicle, a flashlight, a business machine, a lighting device, an imaging device, a protective article, a vision corrective article, or a toy; optionally wherein a surface of the article are partially or completely coated with a hard coat, an ultraviolet light protective coat, an anti-refractive coat, an anti-reflective coat, a scratch resistant coat, or a combination comprising at least one of the foregoing or is metallized.

The singular forms "a," "an," and "the" include plural references unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like. A "combination thereof" is open, and includes any combination comprising at least one of the listed components or properties optionally together with a like component or property not listed.

All test methods refer to those in effect at the filing of the priority application.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" refers broadly to a substituent comprising carbon and hydrogen, optionally with 1 to 6 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylarylene" refers to an aryl group that has been substituted with an alkyl group as defined above, with 4-methylphenyl being an exemplary alkylarylene group; "arylalkylene" refers to an alkyl group that has been substituted with an aryl group as defined above, with benzyl being an exemplary arylalkylene group.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible provided that the substitutions do not significantly adversely affect synthesis or use of the compound. Groups that can be present on a substituted position include (—NO₂), cyano (—CN), halogen, thiocyano (—SCN), $C_{2-6}$ alkanoyl (e.g., acyl (H₃CC(=O)—); carboxamido; $C_{1-6}$ or $C_{1-3}$ alkyl, cycloalkyl, alkenyl, and alkynyl; $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; $C_{6-12}$ aryl having at least one aromatic rings (e.g., phenyl, biphenyl, naphthyl, or the like, each ring either substituted or unsubstituted aromatic); $C_{7-19}$ arylalkylene having 1 to 3 separate or fused rings and from 6 to 18 ring carbon atoms; or arylalkoxy having 1 to 3 separate or fused rings and from 6 to 18 ring carbon atoms. The stated number of carbon atoms includes any substituents.

All references cited herein are incorporated by reference in their entirety. While typical aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A copolycarbonate composition comprising:
a copolycarbonate comprising bisphenol A carbonate units and second carbonate units of the formula

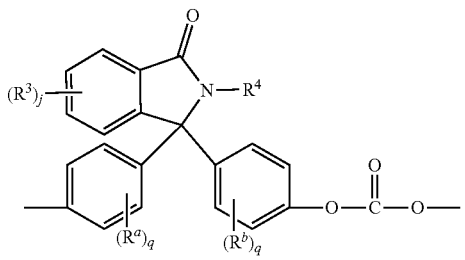

wherein
$R^a$ and $R^b$ are each independently a $C_{1-12}$ alkyl, $C_{1-12}$ alkenyl, $C_{3-8}$ cycloalkyl, or $C_{1-12}$ alkoxy,
each $R^3$ is independently a $C_{1-6}$ alkyl,
$R^4$ is hydrogen, $C_{2-6}$ alkyl, or phenyl optionally substituted with 1 to 5 $C_{1-6}$ alkyl groups,
p, q, and j are each independently 0 to 4; and
wherein the composition further comprises a stabilizer package comprising:
a) a phosphorus-containing acid;
b) an ester of a phosphorus-containing acid; and
c) an organosulfonic stabilizer;
wherein the phosphorus-containing acid and the ester of the phosphorus-containing acid are present in the stabilizer package in a molar ratio of 1 to 2, and
wherein the total stabilization package in the composition is in the amount by weight of 4 to 32 parts per million.

2. The copolycarbonate composition of claim 1, wherein the second carbonate repeating units in the copolycarbonate are of the formula

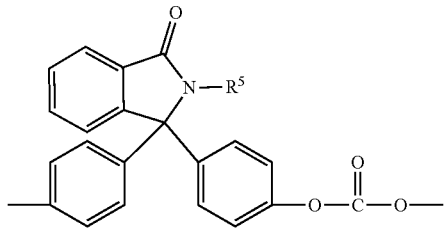

wherein $R^5$ is hydrogen, phenyl, or methyl, preferably phenyl.

3. The copolycarbonate composition of claim 1,
wherein the total stabilization package in the composition is in the amount by weight of 8 to 16 parts per million;
wherein the organosulfonic stabilizer is 2 to 30 parts per million of the polycarbonate composition;
wherein optionally the polycarbonate composition has a heat deformation temperature at 0.45 megapascals of 155° C. or higher as measured according to ASTM D648; and
wherein the polycarbonate composition optionally has a yellowness index of less than 20, as measured by ASTM D1925 on a 3.2 millimeter thick molded plaque.

4. The copolycarbonate composition of any of claim 1,
wherein the organosulfonic stabilizer is 8 to 16 parts per million of the polycarbonate composition;
wherein the polycarbonate composition has a heat deformation temperature at 0.45 megapascals of 155° C. or higher as measured according to ASTM D648; and
wherein the polycarbonate composition has a yellowness index of less than 20 as measured by ASTM D1925 on a 3.2 millimeter thick molded plaque.

5. The copolycarbonate composition of claim 1, wherein, in the stabilizer package:
a) the phosphorus-containing acid is $H_3PO_4$, $H_3PO_3$, $H_3PO_2$, a multi-nuclear phosphorus-containing acid such as pyrophosphoric acid, $H_3P_2O_7$, or a higher analog thereof, or a combination thereof;
b) the ester of the phosphorus-containing acid is a di- or tri-organically-substituted phosphite ester of the formula $(RO)_3-P$, a di- or tri-organically-substituted phosphate ester of the formula $(RO)_3-P=O$, or a combination thereof, wherein each R is independently a monovalent, divalent, or trivalent $C_{5-36}$ hydrocarbyl group or a halogen provided that at least two R are organic, preferably wherein each R is independently pentaerythrityl, 2,2-ethylidene-bis(4,6-di-tert-butylphenyl), octylphenyl, nonylphenyl, 2,4-di-tertiary-butylphenyl, or fluorine provided that at least two R are organic; and
c) the organosulfonic stabilizer has the formula

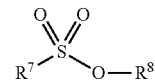

wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen; or $R^8$ is a $C_{1-30}$ alkyl; or $R^8$ is a group of the formula $-S(=O)_2-R^7$.

6. The copolycarbonate composition of claim 1, wherein, in the stabilizer package:
a) the phosphorus-containing acid is $H_3PO_4$, $H_3PO_3$, $H_3PO_2$, pyrophosphoric acid, $H_3P_2O_7$, or a combination thereof;
b) the ester of the phosphorus-containing acid is bis(2,4-di-tertiary-butylphenyl) pentaerythritol diphosphite, 2,2'-ethylidene-bis(4,6-di-t-butyl phenyl) fluorophosphite, tris(2,4-di-tert-butylphenyl) phosphite, tris-(nonylphenyl)phosphite, or a combination thereof; and
c) the organosulfonic stabilizer has the formula

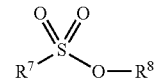

wherein each $R^7$ is a $C_{7-30}$ alkylarylene, and $R^8$ is a $C_{1-5}$ alkyl.

7. The copolycarbonate composition of claim 1, wherein in the stabilizer package
   a) the phosphorus-containing acid is $H_3PO_4$;
   b) the ester of the phosphorus-containing acid is tris(2,4-di-t-butylphenyl)phosphite; and
   c) the organosulfonic stabilizer is butyl tosylate.

8. The copolycarbonate composition of claim 1, wherein the copolycarbonate comprises less than 2 parts per million by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography.

9. The copolycarbonate composition of claim 1, wherein
   the copolycarbonate composition has a bisphenol A purity of at least 99.6%, as determined by high performance liquid chromatography, or at least one of the bisphenol A carbonate units and the bisphenol A homopolycarbonate has a sulfur level of less than or equal to 2 parts per million as measured by a total sulfur analysis based on combustion and coulometric detection; or
   a combination thereof.

10. The copolycarbonate composition of claim 1, wherein the copolycarbonate further comprises at least 5 mol % of third carbonate units different from the bisphenol A carbonate units and the second carbonate unit, based on the total number of carbonate units in the copolycarbonate, the third carbonate units comprising carbonate units of the formula:

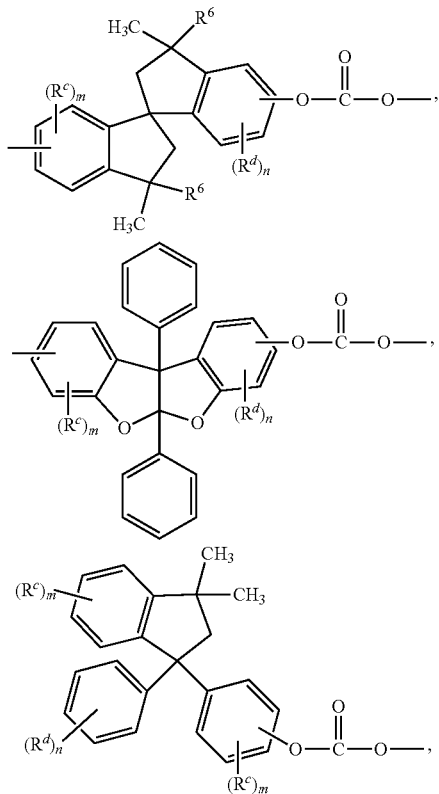

-continued

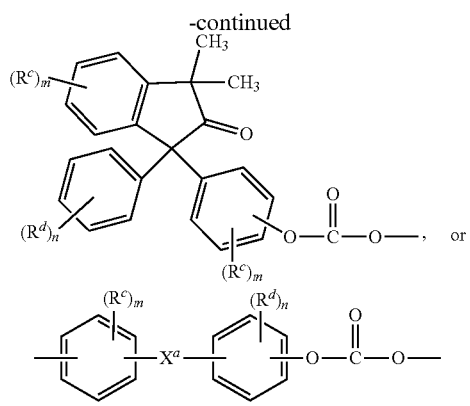

wherein
$R^c$ and $R^d$ are each independently a $C_{1-12}$ alkyl, $C_{1-12}$ alkenyl, $C_{3-8}$ cycloalkyl, or $C_{1-12}$ alkoxy,
each $R^6$ is independently $C_10.3$ alkyl or phenyl,
$X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$group wherein $Q^1$ and $Q^2$ are each independently a $C_{1-3}$ alkylene, G is a $C_{3-10}$ cycloalkylene, x is 0 or 1, and y is 1, or $-C(P^1)(P^2)-$ wherein $P^1$ is $C_{1-12}$ alkyl and $P^2$ is $C_{6-12}$ aryl, and
m and n are each independently 0 to 4, or a combination thereof.

11. The copolycarbonate composition of claim 10, wherein the third carbonate units have the formula

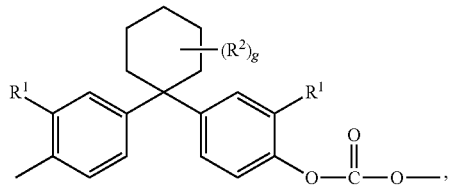

wherein
each $R^1$ is independently hydrogen or methyl,
each $R^2$ is independently methyl or hydrogen, and
g is 0 to 2.

12. The copolycarbonate composition of claim 10, wherein the copolycarbonate comprises from 15 to 70 mol % of the bisphenol A carbonate units, 5 to 50 mol % of the second carbonate units, and 5 to 50 mol % of the third carbonate units, each based on the total number of carbonate units in the copolycarbonate.

13. An article comprising the copolycarbonate composition of claim 1,
   wherein the article is a component of a device comprising a lens, a device comprising a light guide, a device comprising a waveguide, a device comprising a collimator, a device comprising an optical fiber, a device comprising a lighting element, a device comprising a window, a device comprising a door, or the article is a structural component of a vehicle, a building, or an appliance, or the article is a component of a medical device, a component of a display screen, a component of an electronic device, a component of a safety device, a component of a screen, a component of conveyor, a component of a mold, a component of a dish, a component of an enclosure, a component of packaging, a component of a gas barrier, a component of an encapsulant, a component of a label, a component of a gas barrier, a component of a medical device, a component of an anti-fog assembly, or a component of an anti-reflective assembly.

14. The article of claim 13, wherein:

the article has less than 20% variation in a length, width, a height, a curvature, or a surface flatness of the article, or less than 10% change in yellowness index according to ASTM D1925 when the article is subjected to a secondary operation comprising over-molding, lead-free soldering, wave soldering, low temperature soldering, coating, or a combination thereof.

15. The copolycarbonate composition of claim 1, wherein the second carbonate units are present in an amount of 10 to 49 mol % based on the sum of the moles of the copolycarbonate.

16. The copolycarbonate composition of claim 1 further comprising a bisphenol A homopolycarbonate, wherein the second carbonate units are present in an amount of 10 to 49 mol % based on the sum of the moles of the copolycarbonate.

17. The copolycarbonate composition of claim 1, wherein the total stabilization package in the composition is present in an amount by weight of 4 to 32 parts per million.

18. The copolycarbonate composition of claim 1, wherein the organosulfonic stabilizer is 2 to 30 parts per million of the polycarbonate composition.

19. The article of claim 13, wherein the article is a component of a camera, an electronic device, a vehicle, a flashlight, a business machine, a lighting device, an imaging device, a protective article, a vision corrective article, or a toy.

20. The article of claim 13, wherein a surface of the article are partially or completely coated with a hard coat, an ultraviolet light protective coat, an anti-refractive coat, an anti-reflective coat, a scratch resistant coat, or a combination comprising at least one of the foregoing or is metallized.

* * * * *